United States Patent [19]
Riello et al.

[11] Patent Number: 5,720,088
[45] Date of Patent: Feb. 24, 1998

[54] TRANSFER MACHINE TOOLS WITH ROTARY TABLES

[75] Inventors: Andrea Riello; Zeno Borsaro, both of Minerbe, Italy

[73] Assignee: Riello Macchine Utensili Spa, Minerbe, Italy

[21] Appl. No.: 510,909

[22] Filed: Aug. 3, 1995

[30] Foreign Application Priority Data

Aug. 3, 1994 [IT] Italy ................................ MI94U0577

[51] Int. Cl.$^6$ ................................................ B23P 23/00
[52] U.S. Cl. ............................................. 29/38 V; 29/38 A
[58] Field of Search .......................... 29/563, 564, 33 P, 29/38 A, 38 B, 38 C, 36

[56] References Cited

U.S. PATENT DOCUMENTS

| | | | |
|---|---|---|---|
| 2,953,949 | 9/1960 | Witzig et al. | 408/44 |
| 4,454,645 | 6/1984 | Schissler | 29/563 |
| 4,473,930 | 10/1984 | Bezner et al. | 29/38 C |
| 4,520,595 | 6/1985 | Diener | 29/563 |
| 5,090,100 | 2/1992 | Klett et al. | 29/38 C |
| 5,452,502 | 9/1995 | Walter et al. | 29/38 B |

FOREIGN PATENT DOCUMENTS

| | | | |
|---|---|---|---|
| 0 002 527 | 6/1979 | European Pat. Off. | |
| 1 027 959 | 4/1958 | Germany. | |
| 2804584 | 8/1979 | Germany | 29/38 C |
| 42 17 157 | 11/1993 | Germany. | |
| 43 01 393 | 1/1994 | Germany. | |
| 1 181 849 | 9/1985 | U.S.S.R. | |
| 1456297 | 2/1989 | U.S.S.R. | 29/38 A |
| 1 570 874 | 6/1990 | U.S.S.R. | |

*Primary Examiner*—Andrea L. Pitts
*Assistant Examiner*—Christopher Kirkman
*Attorney, Agent, or Firm*—Helfgott & Karas, P.C.

[57] ABSTRACT

In a transfer machine tool with a rotary table, the machining units with horizontal axes are arranged in orientations which do not coincide with the radii of the rotary table and the workpieces being machined are mounted on piece-holder plates which are fixed to the rotary table but are rotatable about vertical axes perpendicular to the plane of the rotary table; for each advance of a workpiece being machined from one work station to the next, the respective plate is rotated through an angle of between 0° and 45° relative to the radius at the next station, the angle possibly being added algebraically to the angle of rotation necessary when the face of the workpiece to be machined is changed.

11 Claims, 4 Drawing Sheets

PRIOR ART

TRANSFER MACHINE TOOLS WITH ROTARY TABLES

BACKGROUND OF THE INVENTION

The present invention relates to machine tools and, more specifically, to an improvement in transfer machine tools of the type with rotary tables, in which the workpieces to be subjected to various mechanical operations are brought to a plurality of work stations in succession by means of a rotary table in order to be acted on by specific machining units.

Machine tools of this type are known and have been used for a long time and, in the most modern forms, provide a base for operatively supporting the machining units so that they surround the rotary table structure which, as already mentioned, advances the workpieces to be machined to the work stations in orderly sequence.

More particularly, in conventional rotary-table transfer machines, both the machining units and the piece-holder plates were and are mounted in fixed positions; the table rotates from one station to the next, presenting the same face of the workpiece to be machined to the next machining unit.

This condition has had and has two main consequences.

In the first place, the machining units are mounted with their axes oriented radially since this is the most effective positioning; additionally, the machining units are substantially fixed, in the sense that a movement thereof along the z axis (thus coinciding with the radius already mentioned) is possible, whereas movements along the x and y axes (which together define a plane coinciding with the face of the base on which the machining unit is mounted) are substantially blocked since these movements are incompatible with the presentation of the workpieces by means of the rotary table.

In the second place, the piece-holder support is also fixed.

Other solutions, which may be considered developments in the sense of giving the machine greater flexibility, have been implemented in relation to this type of rotary-table transfer machine.

In this case, the piece-holder supports fixed to the rotary table can rotate about vertical axes thus enabling any desired face of the workpiece to be machined to be presented to the machining unit.

Moreover, the machining units can also be mounted on the base on movable plates which are anchored to the base but are slidable so as also to be able to perform movements along the x and y axes.

These machines have therefore retained the conventional character in the sense of retaining the radial orientation of the machining units, but have increased machining flexibility as regards the possible operations on the workpieces being machined.

The configuration of the base has also remained conventional and unchanged.

As persons skilled in the art well know, the base has to be able to withstand considerable mechanical stresses which, furthermore, in the case of more modern machine tools, are multidirectional since the machining units act on the workpieces being machined not only frontally in a horizontal direction but also vertically relative to the plane in which the workpieces being machined are moved in succession.

For this reason, a machine-tool configuration in which the base has a circular or polygonal shape and the machining units, as already stated, have lines of action directed radially relative to the rotary table is commonly used.

Moreover, in modern machine tools, there is generally a considerable number of stations, generally including a station for the loading of the workpieces to be machined and for the unloading of those completed, and this, of course, leads to equally considerable dimensions of the rotary transfer platform and, even more, of the base.

By way of indication of the dimensions of the base, if the diameter of the rotary table is of the order of 1.5 meters and that of the base is about twice the size, the overall size of the machine (also taking into consideration the operating space necessary for the machining units) is about twice the diameter of the base.

Naturally, this constitutes not only a disadvantage from the point of view of the final user, given the machining space which necessarily has to be provided in the factory using the machine tool but also, and in particular, a problem for the constructor, not only because the structural work cannot be rationalized, but also since, for example, even a small error of angulation of one of the faces of the base relative to the adjacent faces is translated into a misalignment of the machining unit fixed to that face relative to the perfectly radial direction in which the workpieces being machined, which are presented to the machining unit in succession, have to be engaged.

For a given angulation error, this misalignment is amplified in proportion to the dimensions of the machine.

In addition, the polygonal shape of the bases of conventional machine tools also hinders the rationalization of the lay-out in user factories and the optimization of the electrical and hydraulic service systems of the machine itself.

In fact, the only past or present industrial exception to the situation mentioned above is represented by a machine tool recently produced by Witzig & Frank Turmatic GmbH with the name Triflex-U in which the base does not have the characteristic polyhedral shape. This depends exclusively on a particular structure and shape of the piece-holder table in which, in fact, the workpieces to be subjected to mechanical operations are mounted on supports which have horizontal axes and are rotatable about these axes in vertical planes.

The characteristic feature of this piece-holder table lies in the fact that the axes of the supports for the workpieces to be machined are arranged on tangents or chords of the circle in which the piece-holder table can be inscribed.

This solution therefore differs from conventional solutions, given that it has a completely different structure of the piece-holder table; this construction has a disadvantage since it allows for only four stations of which, naturally, one is required for the loading and unloading of the workpieces, so that there can be no more than three machining stations for the mechanical working of the workpieces, four stations being possible only if a machining unit is added in the loading and unloading station. Although this is hypothetically possible, in practice, it cannot be proposed since the space available for the operator for the loading and unloading of the workpieces would be reduced to unacceptable values.

SUMMARY OF THE INVENTION

The principal object of the present invention is to provide a machine tool structure in which the problems and disadvantages mentioned briefly above can be solved in an industrially advantageous manner with the use of wholly conventional machine tool components, particularly as regards the rotary piece-holder table.

A more specific object of the present invention is to provide a machine tool in which, with the use of a rotary piece-holder table of conventional structure, equipped with piece-holder plates, also of known type, which are spaced apart angularly and are rotatable about axes perpendicular to the plane of the table, it is possible to produce a machine tool in which the base is considerably less bulky and more versatile both from the machining point of view and from the point of view of the construction of the machine tool.

These objects are achieved by the machine tool according to the present invention which comprises a base on which both machining units with horizontal axes and, possibly, machining units with vertical axes are mounted, the machining units being mounted so as to be movable along the x, y and z axes and at least some of the former units having z axes which do not coincide with the radii of a rotary piece-holder table which is supported at the bottom so that it can rotate through predetermined angles through a plurality of stations in each of which the workpieces are machined by means of the machining units, the rotary table having a plurality of piece-holder plates the number of which is equal to the number of stations of the plurality increased by one unit corresponding to the loading and unloading station, the plates being mounted for rotating about axes perpendicular to the plane of the table and being operated by means which can rotate the plates through predetermined angles.

According to whether, upon moving from one work station to the next, the same face of the workpiece is to be machined or the workpiece has to be rotated by a suitable rotation of the plate, the rotation of the plate, and hence the aforementioned predetermined angle, will be between 0° and 45° in the first case (the same face) or will be equal to the algebraic sum of the angle necessary to bring the new face to the radially oriented position and an angle between 0° and 45°.

Moreover, the angle of rotation of the plate (between 0° and 45°) will be negative or positive according to whether the orientation of the axis of the machining unit at the new station is such that it comes before or after the radius at the station.

A substantial advantage of the present invention therefore lies in the fact that the machining units with horizontal axes are oriented so that the bulk of the unit, also including the portion of the machining unit which projects from the base of the machine, is contained between two planes parallel to the vertical planes tangential to the piece-holder table at two diametrally opposed points.

In one embodiment of the present invention, the predetermined angle mentioned above may also differ from the angle through which the rotary piece-holder table rotates between one station and the next for some stations such as those which are not adjacent the station for the loading and unloading of the workpieces.

In fact, in this embodiment, in the stations immediately downstream and upstream of the loading and unloading station, the machining units with horizontal axes can have axes aligned with the radii of the piece-holder table in this station so as to avoid any rotation of the piece-holder plate during the move from the loading station to the first work station and during the move from the last work station to the unloading station, respectively, without affecting the reduction in the size of the base.

BRIEF DESCRIPTION OF THE DRAWINGS

The distinctive aspects and advantages of the machine tool structure according to the present invention will become clearer from the following detailed description given with reference to the appended drawings, in which the conventional solution and that according to the present invention are shown in each drawing.

More specifically.

DESCRIPTION OF PREFERRED EMBODIMENTS

Figure 1:
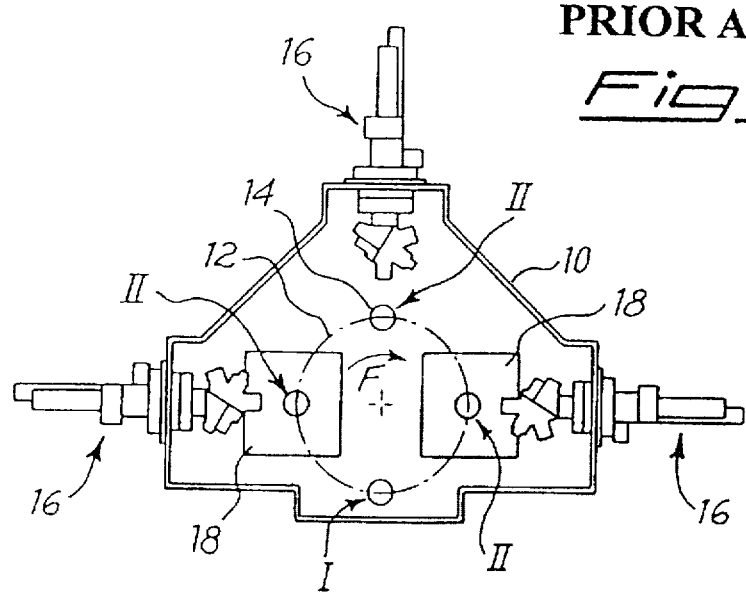
FIGS. 1, 1A and 1B are views of the conventional machine with four stations and of two alternative embodiments of the machine according to the present invention, respectively.

Before the details of the solutions shown in the drawings are described, it should be stated that the drawings are necessarily schematic since they show solely the arrangements of otherwise conventional components of machine tools of this type.

With reference first of all to FIG. 1, this shows a conventional machine tool with four stations, comprising a base 10 which surrounds a rotary table 12 provided with supports 14 which, in known manner, support the workpieces (not shown) to be subjected to mechanical operations, by being presented to the machining units 16, usually provided with tool-holder heads which can rotate in order to use different tools on the same unit according to the operation to be carried out.

In the specific embodiment, the supports 14 rotate about vertical axes, that is, axes perpendicular to the plane of the table 12.

The rotary table 12, which is supported so that it can rotate in predetermined steps, for example, in the sense of the arrow F, advances workpieces from the loading and unloading station I towards the successive work stations, generically indicated II.

As regards the means for operating and controlling both the rotary table and the machining units as well as the piece-holder supports (when it is necessary to orient the workpieces in order to present a different face thereof to the tool of the machining unit) these are electronic devices and mechanisms well known in the art and further details are not therefore necessary.

It is worth pointing out, again with reference to FIG. 1, that the machining units 16 with horizontal axes have axes coinciding with the radii of the tool-holder table 12 in the respective stations II.

It can readily be seen from the same drawing that the size of the base 10 is determined by the positions and machining relationships of the machining units relative to the rotary piece-holder table and the base 10 thus has to be constructed by an extremely laborious and expensive construction operation.

Figure 1A:
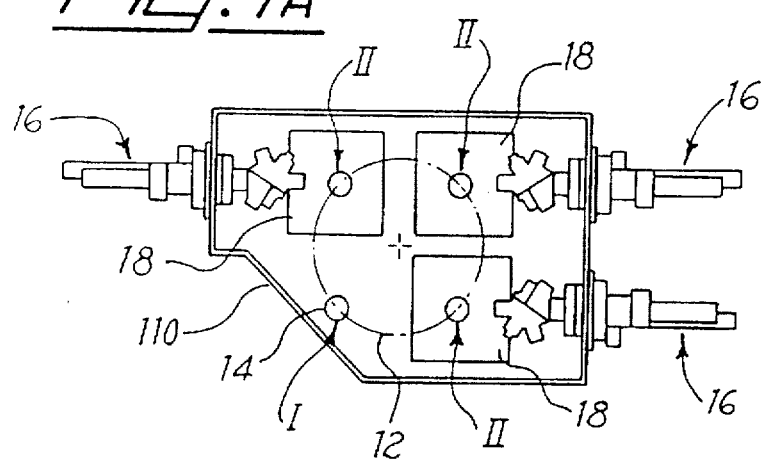

With reference now to the construction according to the present invention shown in FIG. 1A, the components corresponding to those of FIG. 1 are indicated by the same reference numerals and the only one which is different, as will be seen, is identified by the same reference numeral increased by 100.

As can be seen in FIG. 1A, the rotary piece-holder table 12 is rotated intermittently from the station I through the stations II to return to the station I for the unloading of the workpiece, the machining of which has been completed by the machining units 16 and 18.

The table 12 has piece-holder plates 14 which, again, are of the type which can rotate about vertical axes, that is, axes perpendicular to the plane of the table 12.

Figure 7:
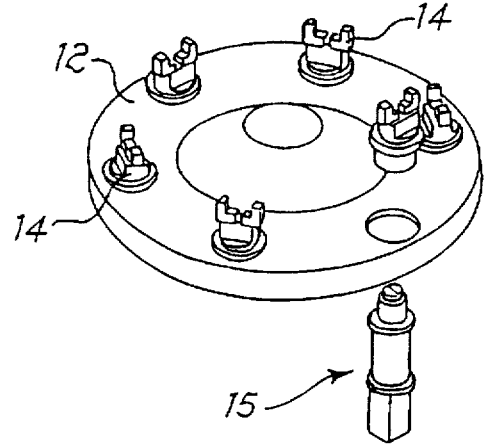
FIG. 7 is a partially exploded, schematic view of the rotary table.

As can be appreciated from FIG. 7, the supports 14 are mounted on the rotary table 12 in a manner such that their bases can be engaged in any station (or in some of the stations) by rotation means of known type, generally indicated 15.

Figure 5:
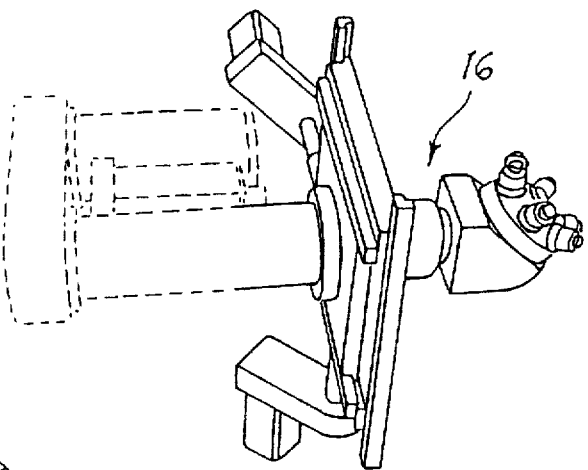
FIGS. 5 and 6 are views of a machining unit and of the respective plate for mounting on the base.
Figure 6:
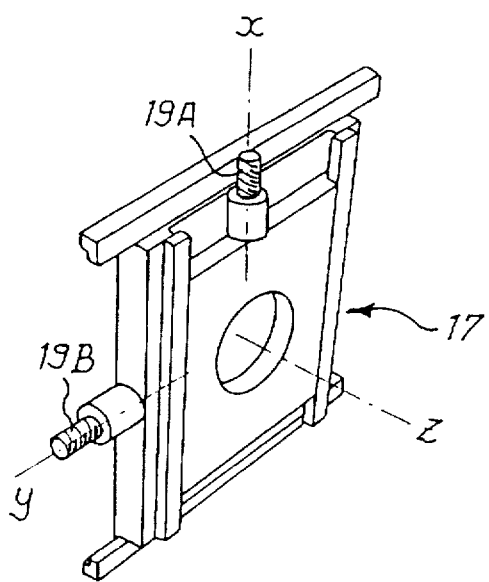

It will be appreciated from FIGS. 5 and 6 that each machining unit 16 is mounted on the base 110 by means of a plate 17, also of known type, which permits movements in the plane of the face of the base 110 (the plane x, y), as can be seen from FIG. 6, by the operation of the screws 19A and 19B, naturally by means of motors and suitable electrical controls.

The machining units with vertical axes, which can operate from above, are indicated 18 and, naturally, are fixed to the base 10, also preferably by means of plates such as those indicated 17 in FIG. 6, in order acquire a capability for controlled movement along the axes x and y.

In each station, the rotary plate 14 is therefore rotated through the predetermined angle if desired so as to bring the desired face for machining of the workpiece supported by the plate 11 into axial alignment with the axis of the corresponding machining unit 16 when the machining is to be carried by a unit 16.

It will also be appreciated from FIG. 1A that, for a machine tool of the same type as that of FIG. 1, the base 110 is of a much more limited size, particularly compatible with industrially simpler and cheaper production.

Naturally, this advantage is the direct result of the fact that, as well as presenting different faces of the workpiece to the tool in operation, in this embodiment, the rotation of the piece-holder plates is also used for re-establishing the correct orientation of the workpiece relative to the machining units, the axes of which need not thus be positioned radially relative to the rotary table.

Another similarly important advantage of the construction according to the present invention lies in the fact that the compact shape of the base brings the overall dimensions of the machine tool down to values compatible with the possibility of road transportation without the need for so-called "special transportation" which is necessary for machinery which exceeds the dimensions of normal transportation trucks.

Figure 1B:
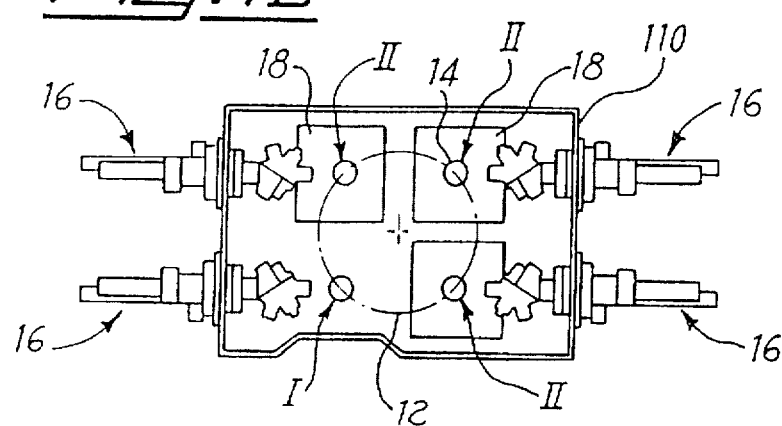

With reference now to FIG. 1B, this shows a variant of the solution of FIG. 1A in which the shape of the base is changed and has been further rationalized. A machining unit 16 is shown in the station I but may be omitted or subsequently added to an original machine which is similar to that of FIG. 1A except for the different shape of the base 110 when, for example, it is necessary to increase the capacity, that is, the number of machining units, of a machine tool which is already installed and operating.

In this case, the production cycle will take into account that, in the station I, it will be possible to carry out a smaller number of steps or steps shorter than those carried out in the other three stations so that the loading and unloading operations can be carried out without adversely affecting the cycle times of the machine and hence its productivity. It will also be noted that, even with the insertion of this additional machining unit 16, the space for the operator employed for loading and unloading the workpieces or for interfacing with a machine for automatically loading and unloading the workpieces remains large and ergonomically ideal.

Figure 2:
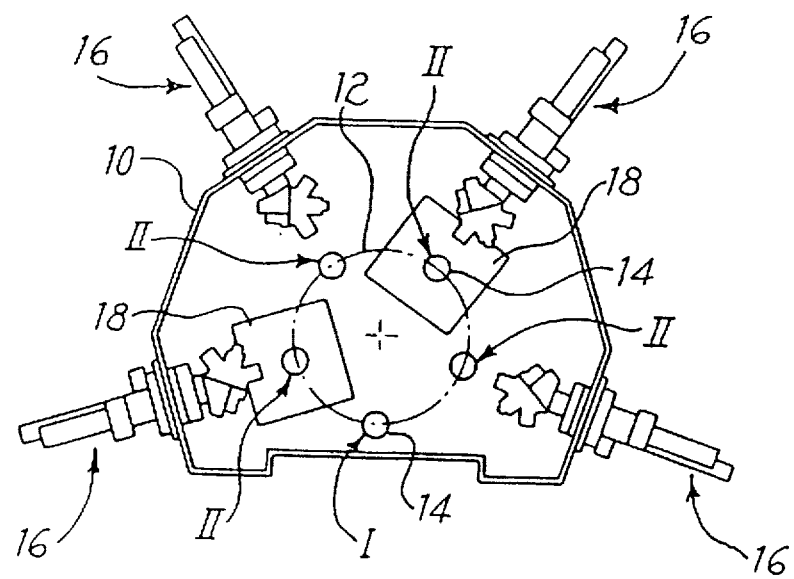
FIGS. 2 and 2A are views similar to FIGS. 1 and 1A of machines with five stations.
Figure 2A:
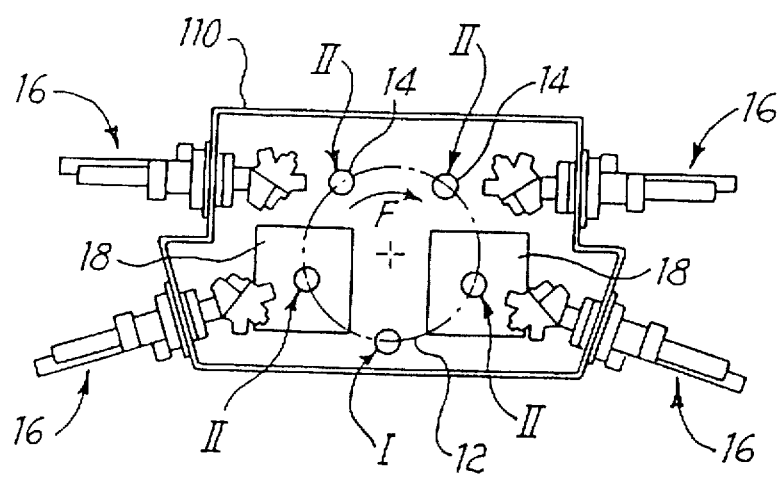

With reference now to FIGS. 2 and 2A, these show a machine tool with five stations which, in FIG. 2, correspond to the same number of machining units (naturally excluding the loading and unloading station I) with axes aligned with the corresponding radii of the rotary table. For ease of comprehension, the same reference numerals have been used in this embodiment as in FIGS. 1 and 1A, the machine of FIG. 2 thus comprising a base 10 which surrounds the rotary table 12 on which supports 14 serve to present the workpieces to be machined in the various stations II to the action of the tools of the machining units 16 (with horizontal axes) and 18 (with vertical axes). The size of the machine tool and of the base are clear from an examination of FIG. 2.

In the embodiment of FIG. 2A in which, as is repeated, the same criterion and the same reference numerals as FIG. 1A have been used, the enormous saving of size of the base 110 and the accompanying substantial structural simplification can readily be seen.

The same advantages already pointed out above also apply in this embodiment.

The foregoing description refers to the machining units 16 indicated in the drawings. Units with tool-holder slides of well-known type may be provided instead of these units.

Figure 3:
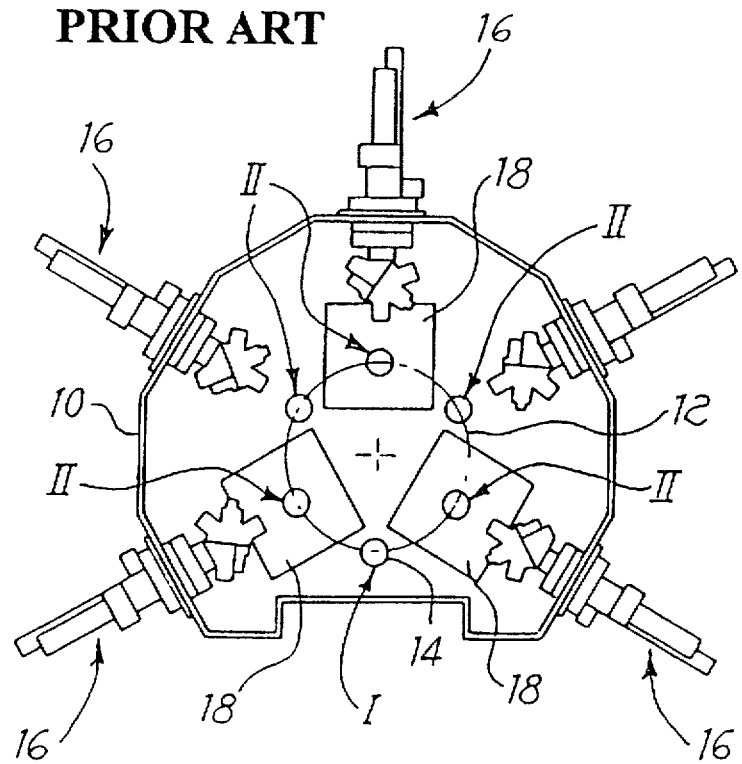
FIGS. 3 and 3A are views of machines with six stations.
Figure 3A:
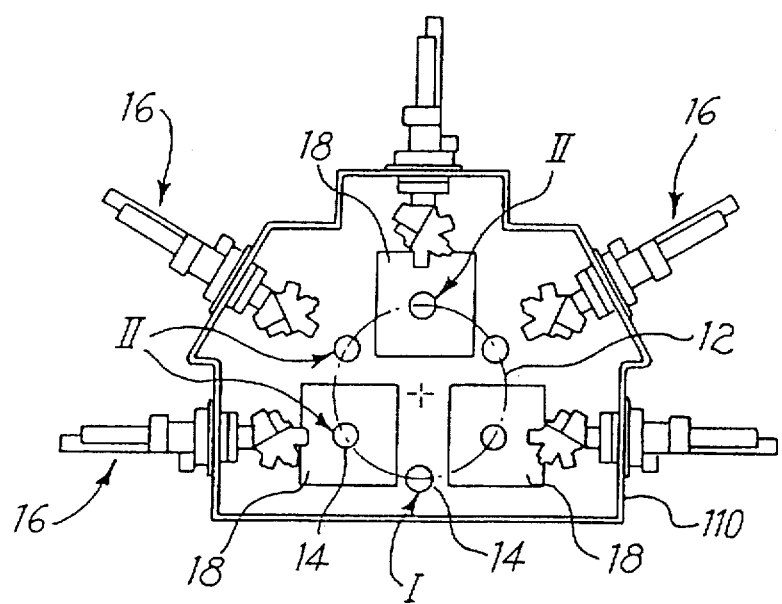
Figure 4:
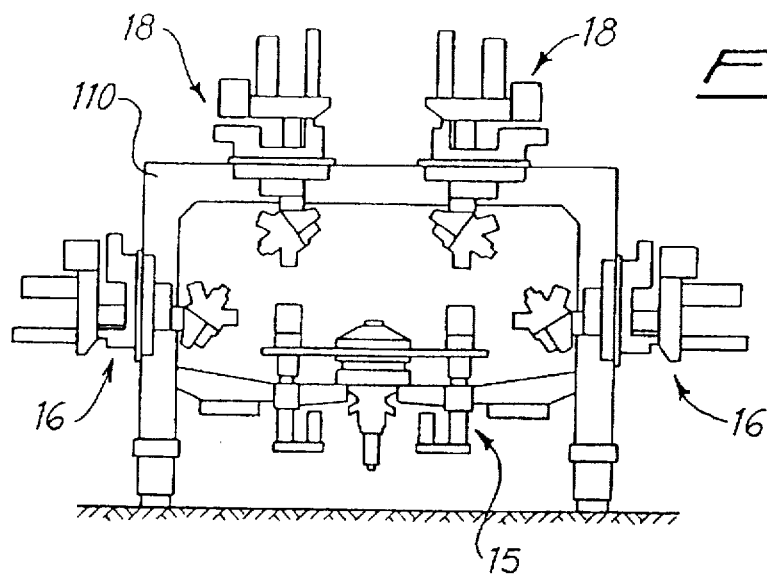
FIG. 4 is an elevational view of the machine of FIG. 2A, partially in section.

Finally, with reference to the solution of FIGS. 3 and 3A, the information already given for FIGS. 2 and 2A is repeated in an identical manner except that this embodiment involves a machine with six stations.

Is can also be appreciated from an examination of FIGS. 2A and 3A that the base 110 has a regular geometrical shape (substantially rectangular in the embodiment of FIG. 2A and substantially pentagonal in the embodiment of FIG. 3A) with deviations owing to the presence of machining units with radially-oriented horizontal axes.

Moreover, it can also be appreciated that, in addition to the possibility of providing not only one but two horizontal units in each work station without adversely affecting the machining, the accessibility, or the structural mechanical strength requirements of the machine, the orientation of the machining units can be fixed solely in dependence on other structural and/or machining requirements of the machine tool by virtue of the fact that the piece-holder plates can be rotated through predetermined angles.

Thus, to summarize the advantageous aspects of the present invention:

- the size of the machine tool is reduced in plan with a consequent saving of useful space in the factory;
- the construction of the welded framework of the base, which has many faces at 90°, is facilitated;
- the mechanical working of the base is simplified, given the parallel or perpendicular arrangements of a large number of its faces;
- the parallel arrangement of the axes of some of the units enables larger openings to be formed in the base without adversely affecting its mechanical strength, to the benefit of accessibility to the interior of the machine;
- the substantial lack of lateral bulk permits better maneuverability of the machines by conventional means (lifters and shunters) for exceptional maintenance and/or repairs;

up to three units (two in the horizontal plane and one with a vertical axis) can be mounted perpendicular to one another in the same work station for the simultaneous machining of up to three faces of the same workpiece;

several units can be grouped in positions close together with consequent rationalization and economy of the electrical and hydraulic services for each unit;

the setting of the machine is simpler and easier since it is possible to use a smaller number of control buttons;

there is complete flexibility in the orientation of the individual machining units relative to the rotary table according to the number of stations and the specific requirements of the operations to be carried out.

We claim:

1. A machine tool comprising:

a base;

a rotary piece-holder table rotatably supported near the bottom of said base to be rotated about a vertical rotation axis by predetermined angles through a plurality of working stations;

a plurality of piece-holder plates mounted to said rotary table, a number of said plates being equal to a number of said working stations increased by one unit corresponding to a loading and unloading station, the piece-holder plates being mounted for rotating in both directions around vertical axes perpendicular to a plane of the rotary table and being operated by means for rotating through predetermined angles when the rotary table is rotated from one working station to an immediately next working station;

at least one machining unit having a horizontal tool rotation axis z being provided at each working station, said tool rotation axis defining with two other directions x and y respective axes perpendicular to one another along which the at least one machining unit is movable, wherein at least one of said machining units has its horizontal tool rotation axis z, which is in skew relationship with the vertical rotation axis of the rotary piece-holder table, and wherein the means for rotating the piece-holder plates are provided in each working station in which the plates are rotated and are operated by engagement of each plate when said plate reaches the corresponding working station.

2. A machine tool according to claim 1, further comprising in at least one of said working stations a machining unit having a vertical tool rotation axis.

3. A machine tool according to claim 1, wherein machining units having a horizontal tooling rotation axis are oriented with a bulk of the machining unit, also including a portion of the machining unit that protrudes from the base, substantially contained between two planes parallel to two vertical planes, which are tangent to the rotary piece-holder table at two diametrically opposed points.

4. A machine tool according to claim 1, wherein in each working station other than the loading and unloading station, there are two machining units having a horizontal tooling rotation axis z, such horizontal tooling rotation axes being perpendicular to one another and being each inclined at an angle of 45° with respect to a radial line connecting a center of said rotary table with a center of the piece-holder plate which is in the working station.

5. A machine tool according to claim 1, wherein the machining units are mounted on the base by means of mounting plates which allow the machining units to move along said x and y axes.

6. A machine tool according to claim 1, wherein there are three of said working stations and a fourth loading and unloading station, and wherein two of the machining units have respective horizontal tooling rotation axes parallel to one another and the base has substantially the shape of a right-angled trapezium, an inclined side of which corresponds to the loading and unloading station.

7. A machine tool according to claim 1, wherein there are three of said working stations and a fourth loading and unloading station, and wherein two of the machining units have respective horizontal tooling rotation axes parallel to one another, and the base is substantially rectangular in shape.

8. A machine tool according to claim 7, wherein there is a fourth machining unit located in the fourth loading and unloading station, and wherein the four machining units all have respective horizontal tooling rotation axes oriented in parallel pairs.

9. A machine tool according to claim 8, wherein a side of the base for loading and unloading of the workpieces is positioned at the first station, on a side of the base that is not occupied by machining units.

10. A machine tool according to claim 1, wherein there are four of said working stations and a fifth loading and unloading station; wherein two of the machining units have respective horizontal tooling rotation axes aligned opposite to one another, whereas the other two machining units have their respective horizontal tooling rotation axes oriented radially with respect to the rotary table; and wherein the base has a substantially rectangular shape with two opposed sides thereof, each supporting two of the machining units, being segmented by a respective inclined side of the mounting of the machining units with radial axes.

11. A machine tool according to claim 1, wherein there are five of said working stations and a sixth loading and unloading station; wherein two of the machining units have their respective horizontal tooling rotation axes aligned opposite to one another, whereas the other three machining units have their respective horizontal tooling rotation axes oriented radially with respect to the rotary table; and wherein the base has a substantially pentagonal shape with two opposite sides thereof, each supporting two of the machining units, being segmented by a respective inclined side for the mounting of the machining units with radial tooling rotation axis, the third unit with radial tooling rotation axis being mounted with such an axis aligned to the loading and unloading station.

* * * * *